United States Patent [19]

Nelson et al.

[11] Patent Number: 4,906,170

[45] Date of Patent: Mar. 6, 1990

[54] APPARATUS FOR PRINTING ON PLASTIC TUBING

[75] Inventors: David C. Nelson; Michael J. Fresh, both of Copley; Thomas B. Allen, Stow, all of Ohio

[73] Assignee: Cello-O-Core, Akron, Ohio

[21] Appl. No.: 156,040

[22] Filed: Feb. 16, 1988

[51] Int. Cl.[4] ........................ B28B 11/16; B29C 47/92

[52] U.S. Cl. ........................................ 425/94; 264/132; 346/24; 400/126; 400/621; 400/708; 425/105; 425/106; 425/142

[58] Field of Search ................ 284/132; 400/621, 703, 400/708, 126; 425/103, 104, 105, 106, 94, 142, 155, 161; 346/24, 35; 118/42, 40, 31.5, 698

[56] References Cited

U.S. PATENT DOCUMENTS

| | | | |
|---|---|---|---|
| 3,002,615 | 10/1961 | Lemelson | 425/155 |
| 3,458,930 | 8/1969 | Melkeraaen et al. | 264/132 |
| 3,606,162 | 9/1971 | Lehmann | 400/126 |
| 3,819,777 | 6/1974 | Vermeerkerger | 425/144 |
| 3,867,882 | 2/1975 | Ahlgren et al. | 400/126 |
| 4,029,006 | 6/1977 | Mercer | 118/DIG. 21 |
| 4,071,592 | 1/1978 | Frisch | 264/132 |
| 4,120,630 | 10/1978 | LaSpisa et al. | 425/142 |
| 4,122,497 | 10/1978 | Suzuki et al. | 346/24 |
| 4,165,512 | 8/1979 | Peterson | 346/24 |
| 4,534,313 | 8/1985 | Louvel | 346/76 L |
| 4,688,049 | 8/1987 | Doyle et al. | 346/75 |

*Primary Examiner*—Jay H. Woo

*Assistant Examiner*—K. P. Nguyen

*Attorney, Agent, or Firm*—Renner, Kenner, Greive, Bobak, Taylor & Weber

[57] ABSTRACT

An apparatus is presented for printing material on an extruded plastic tubing. An extruder forms the plastic tubing of the desired diameter and thickness. The tubing is then drawn through a cooling bath by a pulling mechanism, and cut into desired lengths. The tubing may be dried after the cooling process, and an ink jet printer is utilized to print on the tubing as it is being drawn to be cut. A computer controls the printing process in correlation with the tubing cutter to provide a print signal to the printer in accordance with the desired lengths of tubing. The print heads of the printer are also three-dimensionally adjustable so as to center the printed material on the desired size and length of tubing to be cut.

6 Claims, 4 Drawing Sheets

APPARATUS FOR PRINTING ON PLASTIC TUBING

TECHNICAL FIELD

The invention herein resides in the art of forming a plastic tubing by an extrusion process, and printing material on the plastic tubing. More specifically, the invention relates to a method for printing material on a plastic tubing during the production process thereof, to make it both cost effective, and easily accomplished.

BACKGROUND OF THE INVENTION

The manufacture of plastic tubing has been routinely performed by an extrusion process wherein a plastic material is introduced into an extruder which is used to melt and convey the plastic material through a die end on the extruder, and form the plastic tubing.

The plastic tubing manufactured in this way, may be commonly used as straws for drinking beverages, or by producing a thicker plastic tubing, it may be used as a balloon stick. Large numbers of inflatable toy balloons are sold or given away as novelty items each year. Toy balloons are of two general types, those made of an elastomeric material, either rubber or latex, and those made of a non-elastomeric polymer film, usually polyethylene terphthelate ("mylar"). The latex balloons are stretchable, typically have a short neck surrounding the inflation opening, and may be sold either collapsed or inflated. When sold in inflated form, they may be tied directly to balloon sticks because of their elasticity. "Mylar" balloons are non-stretchable, and are typically metallized to give a silvery appearance, and have a long inflatable neck which is secured to a balloon stick by means of a balloon holder. As these balloons are often sold for specific occasions such as birthdays, anniversaries, or for get well wishes, it has been found that printing a message on the balloon stick is desirable to enhance the overall appearance of the novelty item, and specialize the gift to the recipient. Until now, no effective way of printing messages on these balloon sticks or plastic tubing has been known, which is both cost effective and easily accomplished during the production of the plastic tubing.

SUMMARY OF THE INVENTION

With the foregoing in view, the present invention is intended to provide a method and apparatus for printing messages or material on plastic tubing, particularly balloon sticks, during the extrusion process thereof. The method includes the steps of forming a plastic tubing by extrusion process, and cooling the produced tubing in a cooling bath. After being cooled, the tubing is dried of any moisture from the cooling bath, and a message is then printed on the tubing at intervals corresponding to the desired lengths to which the tubing is to be cut. The production process of the plastic tubing, or balloon sticks, starts with the extrusion of the tubing from an extruder, which is then continuously pulled in a line at high speeds, and cut at desired lengths.

To print messages or material on each length of tubing which is to be cut during this high speed production process, the present invention utilizes a high speed printer, such as an ink jet dot matrix printer, incorporated into the production line. In this way, messages may be printed on the tubing quickly, easily, and cost effectively as the method is carried out during the production process.

The present invention also comprises the supporting structure for the printer, as mentioned hereinabove, which enables three dimensional movement of the printer heads so that the messages will be centered on particular lengths and sizes of plastic tubing. The support structure enables course adjustment down to very fine adjustment, to insure that the printed messages are positioned appropriately. The foregoing and other aspects of the invention will become apparent from the description of the preferred embodiment, to provide an advantageous method of printing material on plastic tubing, and particularly for printing messages on balloon sticks.

BRIEF DESCRIPTION OF THE DRAWINGS

Other objects and features of the present invention will become apparent from the ensuing detailed description in connection with the accompanying drawings, wherein.

DETAILED DESCRIPTION OF THE INVENTION

Referring now to FIGS. 1-4 of the accompanying drawings, one preferred embodiment of the invention will be described.

Figure 1:
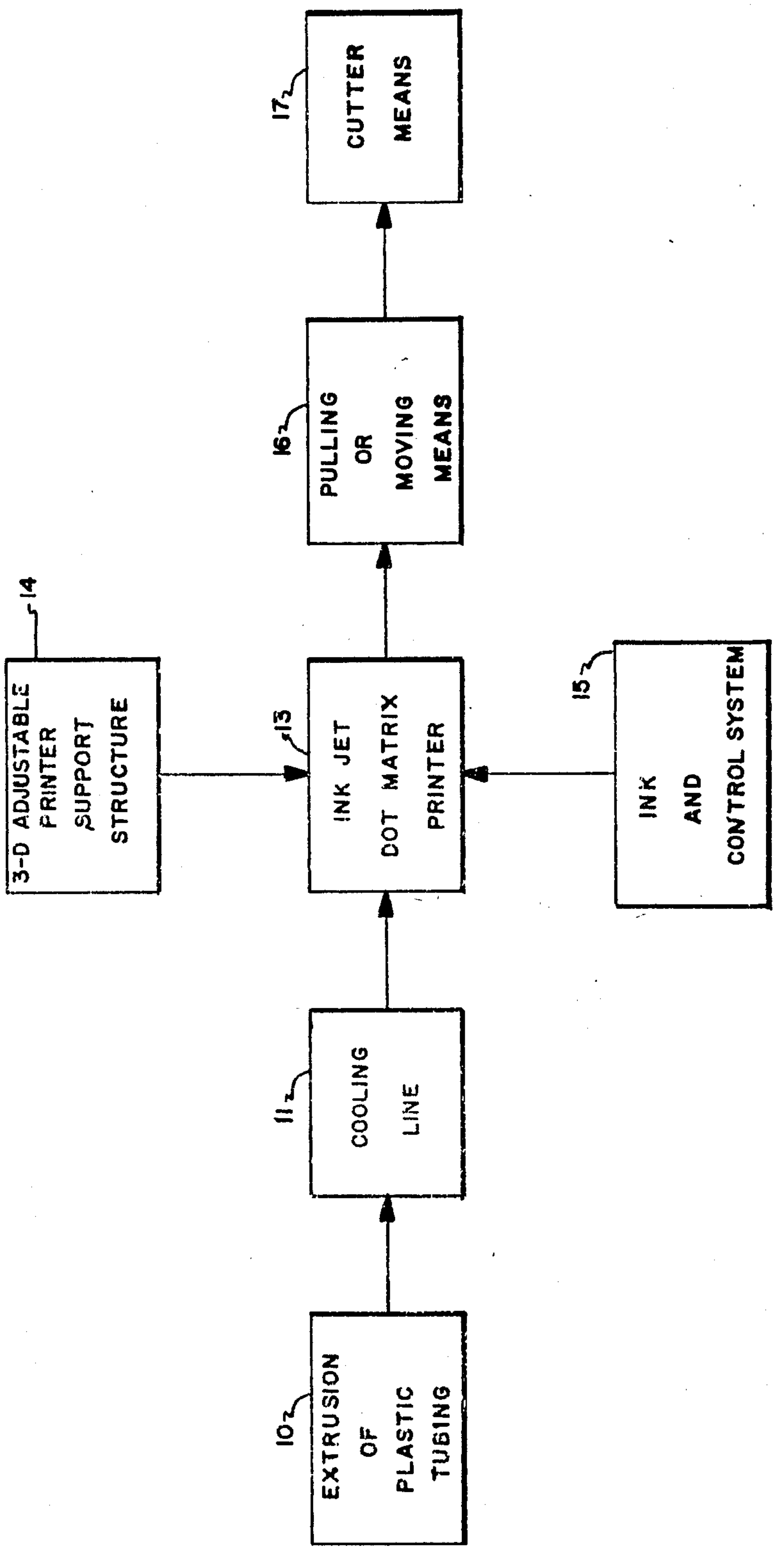
FIG. 1 is a block diagram of the steps of the method of the present invention.

Referring to FIG. 1, the steps of the method are shown, starting with the extrusion of the plastic tubing 10, which includes melting of the plastic material before the tubing is formed, which subsequently must be cooled along cooling line 11. After the tubing is cooled and suitably prepared as by air drying in the line 11, it is ready for printing thereon, by means of an ink jet dot matrix printer 13, supported by the printer support structure 14 which is adjustable three-dimensionally. The printer 13 is supplied with ink, and computer controlled through ink and control system 15. After printing, the production process is completed by a puller or means to move the tubing along the line 16, which continuously moves a length of tubing from the extruder which is then cut into desired lengths by the cutter 17. The printing at 13, is initialized by the action of the cutter 17, which supplies a signal to the control system 15 of the printer. Each of these steps will be described individually and in more detail in the following discussion.

Figure 2:
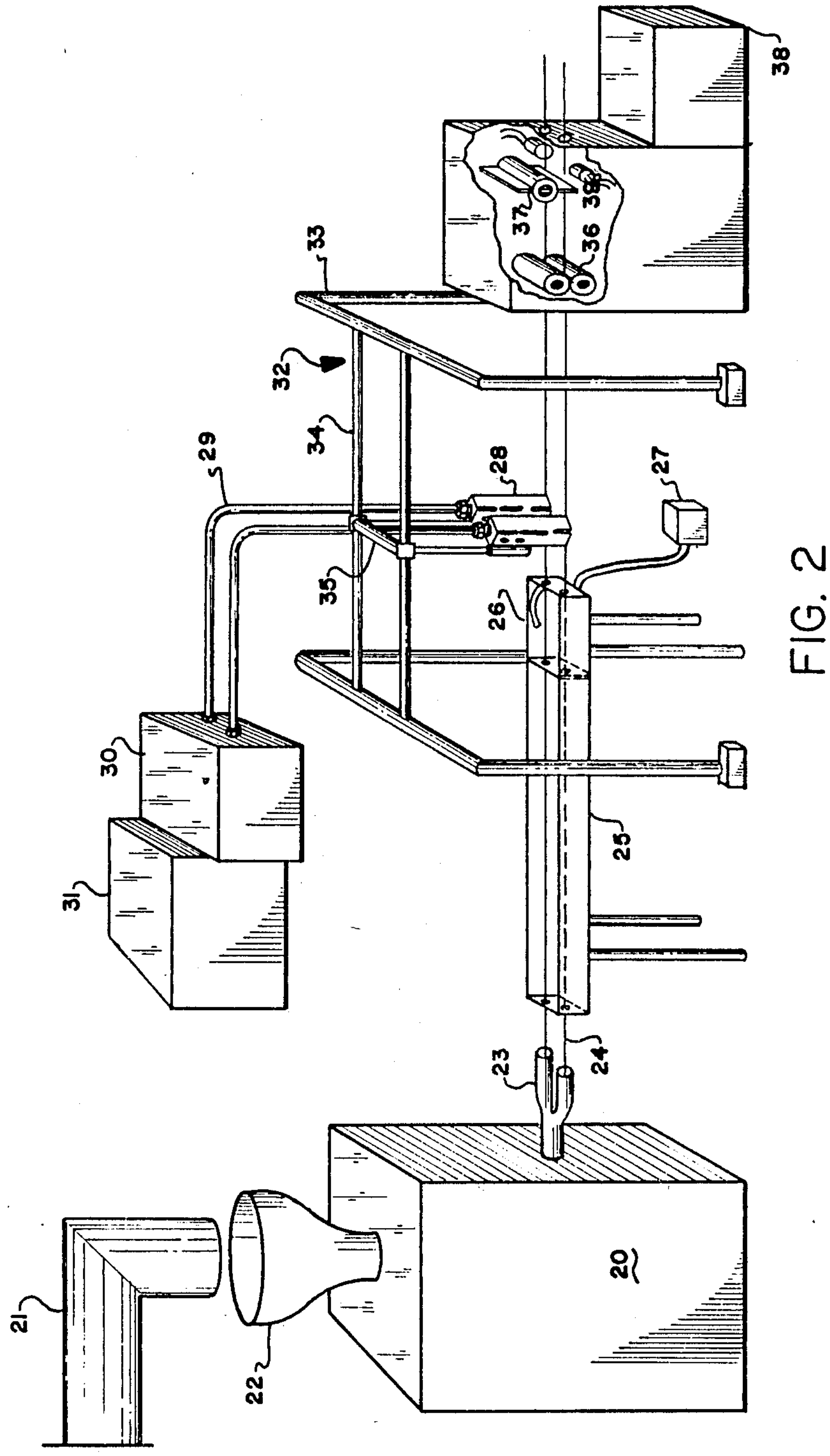
FIG. 2 is a more detailed drawing of the apparatus used in the steps of the method according to this invention.

Turning now to the preferred embodiment shown in FIG. 2, the extruder mentioned above is shown at 20 and comprises a hopper 22 by which the plastic material is introduced into the feed section of the extruder by means of feed line 21. The feed section of the extruder 20 has a barrel with a screw, which conveys the plastic material further into the extruder. The material then enters a transition zone wherein it is melted, metered, and further conveyed to the die end 23 of the extruder. At the die end 23 of the extruder the screw acts to extrude the melted plastic material, such as polystyrene, to form the plastic tubing 24. The diameter and thickness of the plastic tubing 24 can be varied by changing the die or supplying more plastic material to the die through the metering section. After extrusion, the plastic tubing 24 thus formed is cooled in a cooling line 25 and drawn by a pulling machine or mover 36, to be cut in desired lengths by a cutting machine 37. It is noted in FIG. 2, that the die end of the extruder 23 comprises a multiple extrusion die or head, such that two extrusion lines of plastic tubing 24 are produced, which are subsequently pulled by a double-sided puller 36. In this way the action of the cutter 37 is utilized to cut both extrusion lines simultaneously, thereby doubling the output of extruder 20 during a given period of time.

After being cooled by line 25, which may be simply a continuous stream of water flowing over the hot plastic tubing, a hardened rigid plastic tubing which may be used as a balloon stick is formed. The tubing is then dried at section 26 along the production line. The drying may comprise supplying a stream of compressed air over the tubing thereby removing any moisture from the cooling bath 25. An air compressor 27 is utilized for this purpose, which is necessary to prepare the tubing for printing thereon, as any moisture on the surface of the tubing would make the printing impossible. Alternatively, the tubing may be cooled by any other suitable means which does not include a liquid, such that the step of drying may be obviated, while still preparing the tubing for printing thereon. Also, certain plastic materials which may be used, such as a polyethylene plastic, may have to be treated before printing may be done thereon. Such treating may simply be a step of oxidation as by subjecting the plastic material to an open flame. It is therefore embodied in the present invention, to prepare the tubing in any necessary manner to perform the printing step thereon.

Thus, after being prepared, the tubing is drawn under the printing heads 28 of an ink jet dot matrix printer. The ink jet dot matrix printer used in the invention is of a known variety, such as the Domino/AmJet 250SL Ink Jet Printer, manufactured by American Technologies, Inc. Such an ink jet printer is suitable for use with the method of the present invention because it is a non-contact printer which is very fast and accurate, and can be controlled by use of computer. Of course, another printing mechanism with these qualities would be suitable for use with the method of the present invention. It is also possible to use a more conventional contact printer at lower production rates although the printing quality is inconsistent. The ink jet printer comprises printing heads 28 which are supplied with control signals and ink through lines 29 by means of the ink and control system 30, which is in turn run by the suitable computer 31.

The placement of the printer heads 28 over the plastic tubing lines 24 is critical, as the messages printed thereon are to be centered on the subsequently cut lengths of the tubing. Thus, a support structure 32 enabling a three dimensional adjustment of the printing heads 28 is provided. The support system 32 comprises end support structures 33 and carrier beams 34. The printing heads 28 are adjustable along the carrier beams 34 to enable centering messages on different lengths of tubing. Printing heads 28 are also adjustable vertically, and towards or away from one another by means 35, which are to be described in more detail with reference to FIG. 4.

After the messages are printed on the plastic tubing, some space is left between the printing heads and the double-sided puller 36 and cutter 37. This space permits the ink to dry before it is engaged by the puller sections 36, to avoid smearing or smudging of the printed messages. Alternatively, a special ink may be used, which is adapted to be dried when exposed to ultraviolet light. Such inks are known, and would forego the necessity of providing a space for drying of the ink after printing. A suitable source of ultraviolet light could be included in the production line after the printing step to provide a means to dry the ink and avoid smearing.

The double-sided puller 36 comprises two pairs of pinch rollers operated by use of a vacuum clutch to enable the plastic tubing to be pulled at a constant rate of speed. A shaft encoder operates with a feed roller on one of the pairs of pinch rollers, and counts pulses to provide an enable signal to the cutter which then cuts the tubing into desired lengths.

The cutter 37 is simply a bar with suitable cutting means at each end thereof, which is rotated by a shaft. As stated, the shaft encoder associated with the roller of a puller 36 enables rotation of the cutter, thereby cutting each line of plastic tubing to desired lengths simultaneously in one pass. The cutter also comprises a light source directed toward a photocell detector, or a photoelectric means 39, which is used for detecting movement of the cutter. Upon movement of the cutter, the light beam directed at the photocell is interrupted, and the photocell produces a recognizable signal in a well known manner. This signal is coupled to the control system of the printer 30, to initiate printing at printing heads 28. It has been found that monitoring the cutter 37 in this manner enables the printed message to be centered on any length of tubing as it is extruded. The production speed or other variables are therefor not necessary to accurately control to obtain the aesthetic centering of the message. In this way, the desired message is printed on the desired length of the tubing which is subsequently cut at 37. The thus cut lengths of the tubing are received in storage bin 38 to be subsequently packaged. It is seen by the method described that any message may be printed on plastic tubing during the production process thereof.

Figure 3:
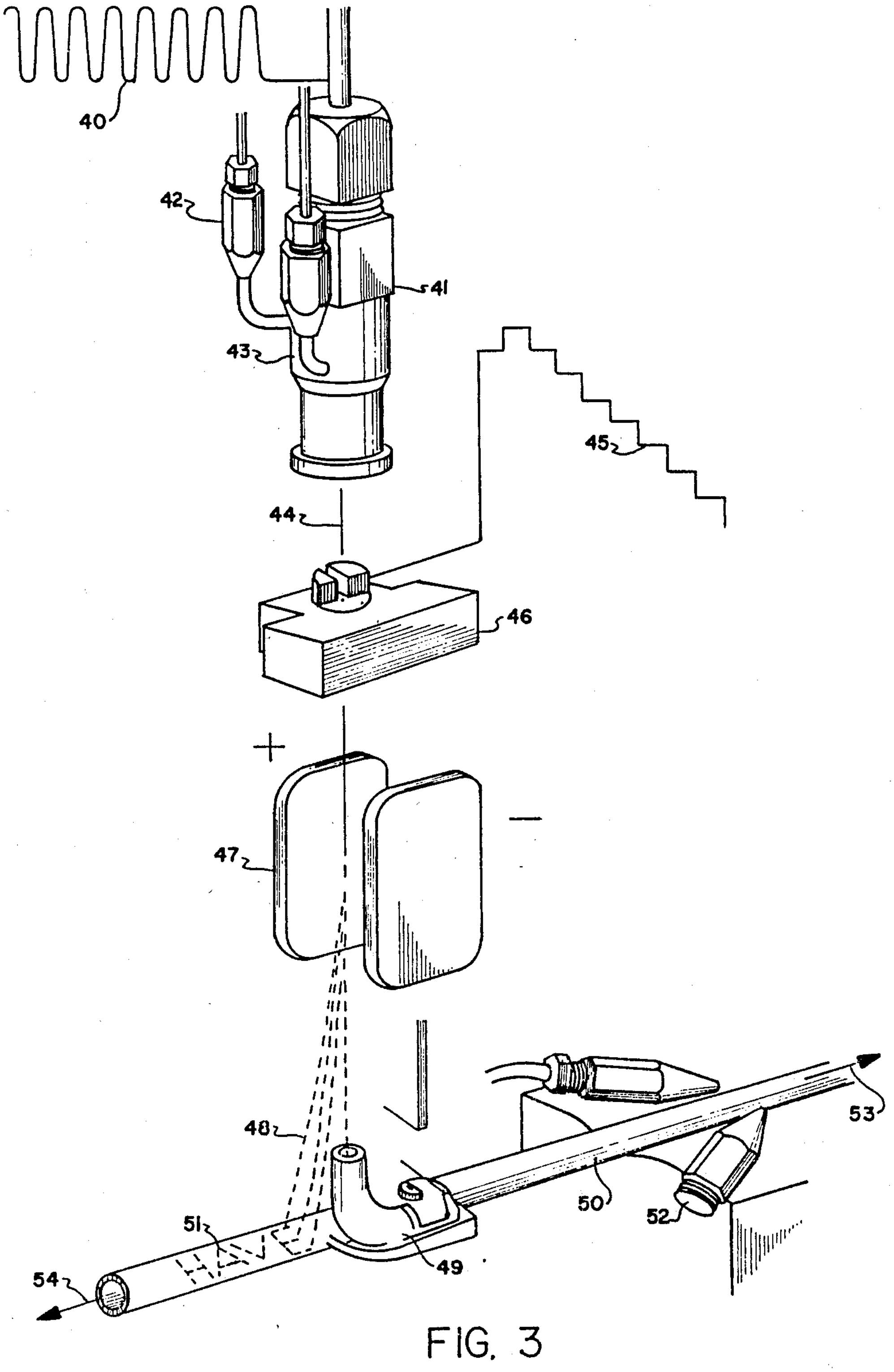
FIG. 3 is an exploded view of the printer used in the preferred embodiment of the method of the present invention.

Now turning to FIG. 3, the more specific description of the printing process used in the method of the present invention will be set forth. An ink jet printing process was found to be suitable for the method of the present invention because firstly, it is a non-contact marking method. Thus, the only thing which touches the material to be marked is the printing ink, which means it is particularly useful for printing on an irregular surface such as plastic tubing. FIG. 3 shows in more detail the printing head of such an ink jet printer as mentioned hereinbefore, which receives a modulation signal 40 from the control unit 30 (of FIG. 2) which is in turn initiated from the signal obtained at the cutter. The printing head comprises the gun body 41, which is supplied with ink through line 42 and an ink bleeding line 43. The gun body thus produces an ink jet 44 which is comprised of a multitude of tiny droplets of ink which are in turn supplied to a charge electrode and phase detector 46. The charge electrode and phase detector 46 is supplied with a charge electrode signal 45 from the control unit, to give each droplet of the ink jet a specific charge according to the message to be printed. The ink jet is then supplied to deflector plates 47 comprising a positive and negatively charged plate, which act to separate the individually charged ink droplets according to the charge electrode signal 45. This produces phasing drops 48, some of which go on to become printed drops 51, and some of which return to the ink system through gutter 49. In this way, individual messages may be printed on the plastic tubing 50 after it is dried by compressed air through nozzles 52 from the cooling bath shown at 53. All this is accomplished as the plastic tubing 50 is being drawn at a high rate of speed, on the order of 200-300 feet per minute, by the puller cutter shown by 54 during the production process. By adjusting the position of the printer head along the length of the tubing 50, the particular messages may be centered on the desired lengths of tubing which are to be cut. This process is somewhat of a trial and error procedure, but as certain messages will be repeated for different purposes, each can be set, and noted for future use. In this way, the support structure mentioned earlier, provides the means for adjusting the printing head to facilitate this procedure. Also the printing head, may be adjusted vertically or from side to side, to accommodate different sizes of tubing, or sizes of the lettering in the messages to be printed on the tubing. Again, the support structure mentioned earlier provides for these adjustments easily and accurately.

Figure 4:
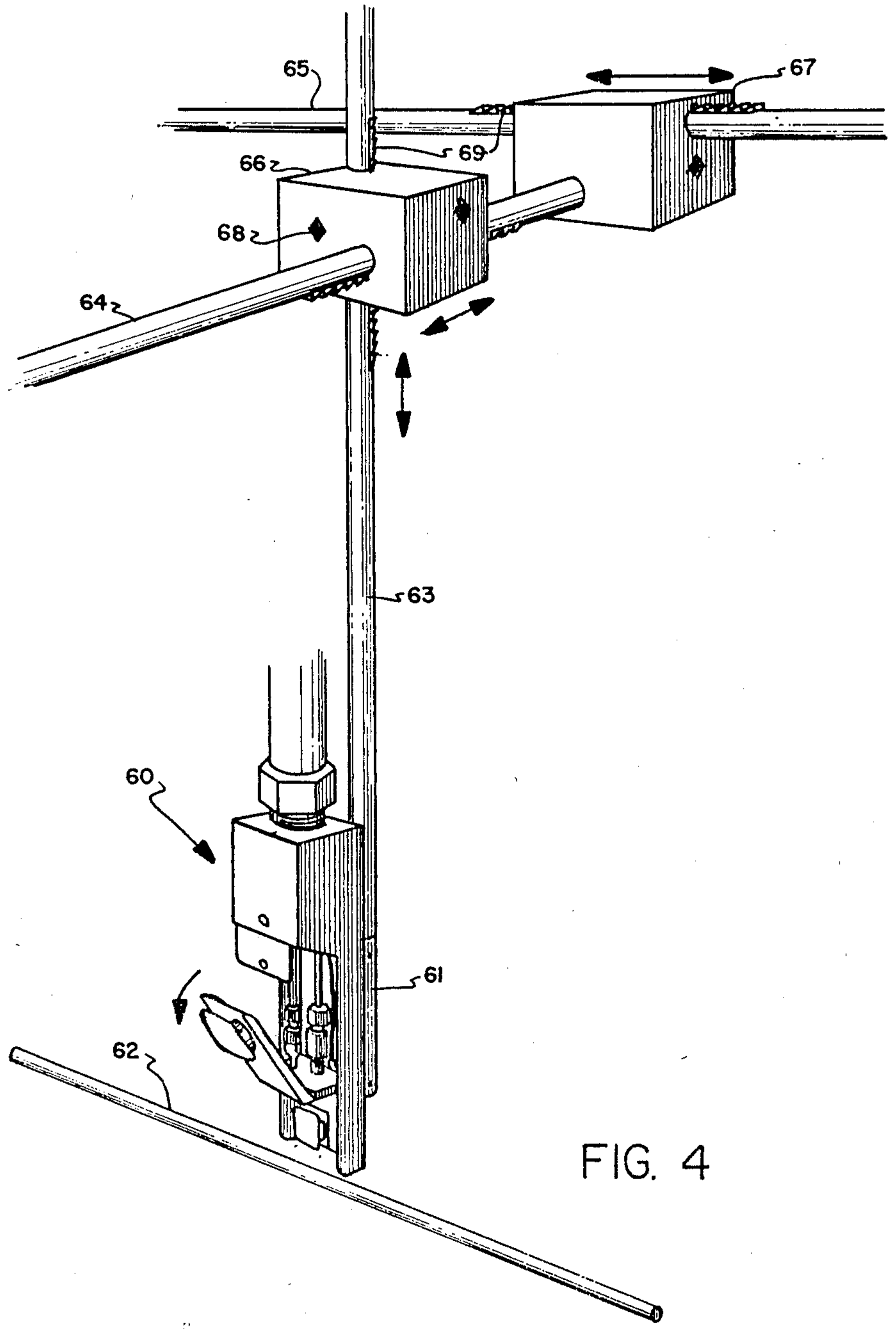
FIG. 4 is a more detailed view of the support structure for the printer in the method of the present invention.

Turning now to FIG. 4, the support structure used in the method of the present invention will be more distinctly described. As shown in the figure, the printhead 60 is positioned over the plastic tubing 62 in order to print thereon, and is supported by a bracket 61 to beam 63. Beam 63 is further supported by beam 64 by means of a supporting block 66. As seen in the figure, the supporting block 66 comprises two perpendicular holes therein, which are spaced from one another and accept the beams 63 and 64. In this way, the printhead 60 is adjustable vertically by means of the movement of beam 63 relative to the supporting block 66. The printhead is also adjustable side to side by the movement of the supporting block along the beam 64. It is noted that each respective beam, 63 and 64, comprises a track 69 with a plurality of teeth thereon. These tracks cooperate with pinion gears mounted in the supporting blocks 66 which are adjustable by lugs 68. By the use of the pinion gears and tracks, the adjustments in each of the directions mentioned hereinbefore are easily accomplished by rotating the lug 68 and thereby turning the pinion gears. Adjustments may be course to very fine facilitating proper placement of message on the plastic tubing 62 regardless of the size of the tubing or of the characters to be printed thereon. It is also noted from the figure that adjustment of the printer head 60 may be made along the length of the plastic tubing 62. By means of another supporting block 67 which is mounted on the carrier beam 65 as mentioned with reference to FIG. 2 this adjustment may be made. The supporting block 67 also has two perpendicular holes cooperating with carrier beam 65 and beam 64. In this way, supporting block 67 supports the beam 64 which in turn supports the printing head 60. The carrier beam 65 also has a similar track and pinion gear for adjustment along beam 65 and thereby affording adjustment of printing head 60 along the length of the plastic tubing 62. By this adjustment, the printed message may be centered on any desired length of the plastic tubing which is subsequently cut.

As previously mentioned, the cutter 37 is activated by a shaft encoder in conjunction with the production speed. A signal produced by photoelectric means 39 will initiate printing and adjustment of the printing heads according to this signal, is accomplished by the support structure. It is noted that the lugs 68, used for the three dimensional adjustment of the printing head 60, cooperate with a standard wrench, and are just one way of providing such adjustment. Alternatively, the adjustments may be made by servo-motors, which may themselves be controlled by a suitable computer. The supporting means thus described, provides the means whereby messages may be accurately printed on the extruded plastic tubing during the production process.

While one particular arrangement for carrying out the method of the invention has been described, it is to be understood that other arrangements may be used if desired, and the thrust of the present invention is to provide a suitable arrangement for carrying out the method of the invention during the extrusion process of the plastic tubing. For example, another suitable printing means having the desired qualities of speed, accuracy, and being non-contact in its operation, may be sufficient to incorporate into the method. Also, alternatively to the double sided puller and cutter 36, 37 as shown in FIG. 2 of the present invention, suitable individual pullers and cutters may be utilized such as manufactured by Gatto, Inc. as is well known in the art.

Thus it can be seen that the objects of the invention, achieved by the steps of the method presented hereinabove, provide an easily accomplished method which is both cost effective, and produces an improved product such as a balloon stick with a suitable message printed thereon. It is further appreciated that modification of the particular embodiment described may be resorted to without departing from the scope and breadth of the invention, as described in the appended claims.

What is claimed is:

1. An apparatus to form printed tubing, comprising;
- a means to extrude a continuous tube;
- a means to move said tube through a cooling section, and print section to a tube severing section;
- said print section containing a computer controlled printing head; and
- said tube severing section containing means to signal said computer and initiate printing at said printing section upon actuation of said tube severing section to cut said tube.

2. An apparatus as in claim 1, further comprising;
- a support means for said printing head, which enables three-dimensional movement of said printing head.

3. An apparatus as in claim 1; wherein said printing head comprises a non-contact ink jet printing head.

4. An apparatus as in claim 1; wherein said means to extrude comprises a multiple extrusion head forming two continuous extruded tubes.

5. An apparatus as in claim 1; wherein said means to signal is a photoelectric detector providing a signal upon movement of the tube severing means.

6. An apparatus as in claim 5; wherein said printing head is placed at a position relative to said tube severing means so as to center the printed material on severed lengths of said tubing.

* * * * *